(12) United States Patent
Goodbrand et al.

(10) Patent No.: US 6,187,082 B1
(45) Date of Patent: *Feb. 13, 2001

(54) INK COMPOSITIONS

(75) Inventors: H. Bruce Goodbrand, Hamilton; Danielle C. Boils, Mississauga; Pudupadi R. Sundararajan, Oakville; Raymond W. Wong; Shadi L. Malhotra, both of Mississauga, all of (CA)

(73) Assignee: Xerox Corporation, Stamford, CT (US)

( * ) Notice: Under 35 U.S.C. 154(b), the term of this patent shall be extended for 0 days.

This patent is subject to a terminal disclaimer.

(21) Appl. No.: 09/281,682

(22) Filed: Mar. 30, 1999

(51) Int. Cl.$^7$ .................................................... C09D 11/00
(52) U.S. Cl. ...................... 106/31.29; 106/31.61; 106/31.43; 106/31.75; 106/31.58; 106/31.86
(58) Field of Search ................ 106/31.29, 31.61, 106/31.43, 31.75, 31.58, 31.86

(56) References Cited

U.S. PATENT DOCUMENTS

| | | | |
|---|---|---|---|
| 3,953,218 | * 4/1976 | Pollard | 106/31.75 |
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,111,220 | 5/1992 | Hadimioglu et al. | 346/140 R |
| 5,121,141 | 6/1992 | Hadimioglu et al. | 346/140 R |
| 5,122,187 | 6/1992 | Schwarz et al. | 106/25 |
| 5,124,718 | 6/1992 | Koike et al. | 346/1.1 |
| 5,371,531 | 12/1994 | Rezanka et al. | 347/43 |
| 5,538,550 | * 7/1996 | Yaegashi et al. | 106/31.43 |
| 5,667,568 | 9/1997 | Sacripante et al. | 106/20 R |
| 5,698,017 | 12/1997 | Sacripante et al. | 106/31.49 |
| 5,698,128 | 12/1997 | Sakai et al. | 219/745 |
| 5,700,316 | 12/1997 | Pontes et al. | 106/31.58 |
| 5,897,940 | * 4/1999 | Malhotra | 428/212 |

* cited by examiner

Primary Examiner—Helene Klemanski
Assistant Examiner—Veronica F. Faison
(74) Attorney, Agent, or Firm—E. O. Palazzo

(57) ABSTRACT

An ink composition comprised of (1) a thiourea with a melting point of from about 60 to about 120° C. and with an acoustic-loss value of from about 25 to about 80 dB/mm, (2) an optional ink carbamate with a melting point of from about 25° C. to about 60° C. and with an acoustic-loss value of from about 5 to about 40 dB/mm, (3) a lightfastness component, (4) a lightfast antioxidant, and (5) a colorant.

45 Claims, No Drawings

INK COMPOSITIONS

REFERENCE TO COPENDING PATENT APPLICATIONS AND PATENTS

Inks which may be selected for acoustic ink printing processes are illustrated in Patents and copending patent applications: U.S. Pat. No. 5,931,995, U.S. Pat. No. 5,902,390, U.S. Pat. No. 5,876,492, U.S. Pat. No. 5,922,117, U.S. Pat. No. 5,958,119; and U.S. Pat. No. 6,045,607 and U.S. application Ser. No. 09/281,540, the disclosures of each being totally incorporated herein by reference.

In U.S. application Ser. No. 935,929 there are illustrated inks, which can be prepared by mixing 46 percent by weight of a liquid vehicle nonanoic acid, 42 percent by weight of the solid paper additive pentadecanoic acid, 3 percent by weight of a UV absorber 2-(4-benzoyl-3-hydroxy phenoxy) ethylacrylate 3 percent by weight of an antioxidant dioctadecyl-3,3'-thiodipropionate, and 6 percent by weight of a colorant selected from Orasol Black RLP, Sudan Blue 670, Sudan Red 462, or Sudan Yellow 146, and which inks provided images with optical density values of 1.6 (Black), 1.6 (Cyan), 1.35 (Magenta), 0.9 (Yellow); there are disclosed in U.S. Pat. No. 5,958,119 inks, which can be prepared, for example, by mixing 30 percent by weight of a liquid cyclic vehicle 1-acetyl-2-methyl-1-cyclopentene, 35 percent by weight of the solid paper additive 2,4,8,10-tetra oxa spiro [5.5] undecane, 20 percent by weight of the nitrile liquid crystalline compound 4'-(pentyloxy)4biphenyl carbonitrile, 5 percent by weight of the UV absorber 2-dodecyl-N-(2,2,6,6-tetramethyl-4-piperidinyl) succinimide, 5 percent by weight of the antioxidant tetra-sodium-N-(1,2-dicarboxyethyl)-N-octadecyl sulfosuccinamate, and 5 percent by weight of a colorant selected from Orasol Black RLP, Sudan Blue 670, Sudan Red 462, Sudan Yellow 146 provided images with optical density values of 1.52 (Black), 1.54 (Cyan), 1.32 (Magenta), 0.95 (Yellow); there are illustrated in U.S. Pat. No. 5,902,380 inks, which can be prepared by mixing 46 percent by weight of a liquid vehicle 4-ethyl cyclohexanone, 42 percent by weight of the solid paper additivel,6-dioxaspiro [4,4] nonane-2,7-dione, 3 percent by weight of the UV absorber 2-hydroxy-4-(octyloxy) benzophenone, 3 percent by weight of the antioxidant 2,2'-ethylidene-bis(4,6-di-tert-butylphenyl) fluoro phosphonite, and 6 percent by weight of a colorant selected from Orasol Black RLP, Sudan Blue 670, Sudan Red 462, Sudan Yellow 146, provided images with optical density values of 1.68 (Black), 1.61 (Cyan), 1.37 (Magenta), 0.92 (Yellow); and in U.S. Pat. No. 5,876,492 there are illustrated inks prepared by mixing 35 percent by weight of a liquid ester γ-butyrolactone, (Aldrich #B10,360-8), 35 percent by weight of the solid additive methyl tetracosanoate, (Aldrich #29,905-7), 20 percent by weight of the liquid crystalline ester material 4-[(R)-(−)2-chloro-3-methyl butyryl oxy] phenyl-4-(decyloxy) benzoate, 2 percent by weight of the UV absorber hexadecyl 3,5-di-tert-butyl-4-hydroxybenzoate, 2 percent by weight of the antioxidant 3-hydroxy-2,2-dimethyl propyl-3-hydroxy-2,2-dimethyl propionate and 6 percent by weight of the colorant selected from Orasol Black RLP, Sudan Blue 670, Sudan Red 462, Sudan Yellow 146, and which inks can generate images with optical density values of 1.65 (Black), 1.65 (Cyan), 1.45 (Magenta), 0.9 (Yellow). The disclosures of each of these copending applications are totally incorporated herein by reference.

The appropriate components and processes of the above copending applications may be selected for the present invention in embodiments thereof.

BACKGROUND OF THE INVENTION

The present invention is directed to ink compositions, and more specifically, the present invention relates to inks with an ink melting point of, for example, between about 60° C. and about 150° C., and preferably between about 70° C. to about 90° C., and which inks are especially useful for acoustic ink printing, processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in the above recited copending applications, such as an acoustic ink printer for printing images on a record medium.

The inks of the present invention in embodiments can be considered phase change inks, that is, for example, an ink that changes from a liquid state to solid state in a suitable period of time, for example, from about 1 to about 100 milliseconds and preferably in less than about 10, such as from about 2 to about 7 milliseconds, and which inks are comprised of: (1) a phase-change color spreading compound, or an additive that preferably fills the pores of a substrate, such as paper, and which compound has a melting point of, for example, lower than about 120° C. and preferably between about 60° C. to about 100° C., and with a low acoustic loss value of below about 100 dB/mm, (2) a non-aqueous diluent additive with, for example, a boiling point higher than about 150° C., and more specifically, with a boiling point of from about 150° C. to about 225° C. and preferably from about 170° C. to about 200° C., and a melting point of less than about 60° C., and with a low acoustic loss, which enables a reduction, or minimization of energy consumption, and which acoustic loss is preferably in the range of from about 5 to about 60 dB/mm, and preferably between about 5 to about 40 dB/mm, (3) a lightfast UV absorber, (4) a lightfast antioxidant, (5) and a colorant such as a dye, a pigment or mixtures thereof. More specifically, the present invention is directed to phase-change acoustic ink compositions comprised of: (1) a nonaqueous thiourea, or an oxime compound vehicle with, for example, a melting point of lower than about 120° C. and preferably between about 60° C. and about 100° C., and preferably with a low acoustic loss and which acoustic loss is, for example, below about 100 dB/mm, and preferably in the range of between about 25 to about 80 dB/mm at the jetting temperature, (2) a nonaqueous diluent derived from a carbamate, thiourea, or an oxime compound, each with a boiling point of higher than about 150° C. and lower than about 350° C., and preferably between about 170° C. to about 300° C., and a melting point of less than about 60° C. and with low acoustic loss and which acoustic loss is below about 60 dB/mm, and preferably in the range of from about 35 to about 55 dB/mm, (3) a UV absorber, (4) an antioxidant, and (5) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness of, for example, between about 90 to about 100 percent, and superior waterfast values of, for example, between about 95 to about 100 percent. Moreover, in embodiments of the present invention there is enabled the elimination, or minimization of undesirable paper curl since water need not be present, or minimum amounts less than about 1 percent of water may be selected in embodiments in the invention inks, and it is preferred that there be an absence of water. When water is not present in the inks a dryer can be avoided thereby minimizing the cost of the acoustic ink jet apparatus and process.

PRIOR ART

In acoustic ink printing, the print head produces approximately 0.5 to 8 picoliter and preferably about 2 picoliter droplets by an acoustic energy process. The ink under these conditions should preferably display a melt viscosity of about 10 centipoise or less at the jetting temperature. Furthermore, once the ink is jetted onto the paper, the ink image should possess excellent crease properties, and should be nonsmearing, waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can normally tolerate a temperature up to about 180° C., and preferably up to a temperature of from about 130° C. to about 160° C., the vehicle for the ink should preferably display liquid like properties such as a viscosity of 1 to about 10 centipoise at a temperature of from about 75° C. to about 165° C., and solidify or harden after jetting onto paper such that the ink displays a hardness value of from about 0.1 to about 0.5 millimeter measured utilizing a penetrometer according to the ASTM penetration method D1 321.

Ink jet-printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. Thus, the ink dye vehicle is selected with a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal ink jet printing processes employing phase-change inks, the solid ink is melted by a heater in the printing apparatus and utilized as a liquid in a manner similar to that of conventional thermal or piezoelectric ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase-change ink jets are somewhat similar to thermal ink jets, however, a phase-change ink contains no solvent. Thus, rather than being liquid at room temperature, a phase-change ink is typically a solid with a wax-like consistency. These inks usually need to be heated, for example, to approximately 100° C. before the ink melts and turns into a liquid. With phase-change inks, a plurality of ink jet nozzles is provided in a printhead. A piezoelectric vibrating element is located in each ink channel upstream from a nozzle so that the piezoelectric oscillations propel ink through the nozzle. After the phase-change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers to obtain photo like quality images, which are more expensive than plain paper.

One advantage of phase-change ink is its ability to print on plain paper since the phase-change ink quickly solidifies as it cools, and since it is waxy in nature, it does not normally soak into a paper medium. However, phase-change inkjet systems can be cumbersome in structure and in design, that is, the associated integrated electronics of a thermal ink jet head are considerably more compact than those of a phase-change ink jet head.

In addition, U.S. Pat. No. 4,751,528, the disclosure of which is totally incorporated herein by reference, discloses a phase-change ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify the phase-change ink in a selected zone more rapidly to avoid offset by a pinch roll coming in contact with the surface of the substrate to which the phase-change ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate inserted within an essentially nonheat conducting reservoir housing.

In U.S. Pat. No. 4,840,674, the disclosure of which is totally incorporated herein by reference, there is disclosed an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar, in that, for example, the invention vehicle selected displays excellent acoustic loss values at a viscosity of from about 1 to about 20, and preferably about 10 centipoise when heated to a temperature of from about 125° C. to about 165° C., such that acoustic energy in the printhead can eject an ink droplet onto paper.

U.S. Pat. No. 5,041,161, the disclosure of which is totally incorporated herein by reference, discloses an ink jet ink, which undergoes a phase-change at room temperature, and which inks comprise vehicles, such as acids, aldehydes, and mixtures thereof. The ink is impulse jetted at an elevated temperature in the range of about 45° C. to about 110° C., at which temperature the ink has a viscosity of about 10 to 15 centipoise. The inks also contain 0.1 to 20 weight percent of a colorant .

U.S. Pat. No. 4,853,036 and U.S. Pat. No. 5,124,718 disclose an ink for ink jet recording which utilizes a liquid composition comprising a colorant, a volatile solvent with a vapor pressure of 1 millimeter Hg or more at 25° C., and a solid compound at room temperature with a molecular weight of about 300 or more.

U.S. Pat. No. 5,667,568 discloses an ink composition comprised of a colorant and a bisamide with a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,698,128 discloses an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly (alkylene oxide)-alkylate, a poly (alkylene oxide)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

The inks of U.S. Pat. No. 5,667,568, based on blends of N'didecylbis-stearamide, 95 percent by weight and a colorant 5 percent by weight and the inks of U.S. Pat. No. 5,698,128 derived from blends of the reaction product of an anhydride and an organoamine, 95 percent by weight and a colorant 5 percent by weight possess, for example, viscosities in the range of about 10 to about 15 centipoise compared to viscosities of, for example, about 5 to 5.5 centipoise in embodiments for some of the inks of the present invention.

SUMMARY OF THE INVENTION

While the known ink compositions and processes may be suitable for their intended purposes, a need remains for acoustic phase-change ink compositions suitable for ink jet printing. In addition, there is a need for phase-change ink compositions, which are compatible with a wide variety of plain papers and can provide photographic quality images on plain and coated papers. Further, there is a need for phase-change ink compositions, which generate high quality, lightfast, and waterfast images on plain papers. There is also a need for phase-change ink jet ink compositions which generate high quality, fast-drying images on a wide variety of plain papers at low cost with high quality text and high quality graphics, and wherein the dye is retained on the paper surface while the ink vehicle can continue to spread within the paper structure. Further, there is a need for phase-change ink jet ink compositions, which exhibit minimal feathering. Additionally, there is a need for phasechange ink jet ink compositions, which exhibit minimal intercolor bleed. There is also a need for phase-change ink jet ink compositions, which exhibit excellent image permanence. Further, there is a need for phase-change ink jet ink compositions, which are suitable for use in acoustic ink jet printing processes. Additionally, there is a need for phase-change hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. Moreover, there is a need for phase-change inks with a spherulite (spherical shape of the ink crystals) size of the ink particles of an average of about 6 to about 9 micrometers during solidification, and which size can be decreased to between about 1 to about 4 micrometer by crystallinity inhibitor diluents derived, for example, from low melt carbamates, thiourea compounds and oxime compounds, to thereby improve projection efficiency and crease resistance. Moreover, there is a need for an ink compositions which are comprised of a blend of one or more, for example, a mixture such as two thioureas or oximes, which when solidified on a substrate, form a dispersion of one of the crystalline phases in the matrix of the other, inhibiting the spherulite growth. These and other needs can be achievable with the inks of the present invention in embodiments thereof.

Disclosed is a nonaqueous, or substantially water free or water free ink composition comprised of (1) a first solid carbamate, (2) a second carbamate with a dissimilar melting point than said first solid carbamate (1), (3) a lightfastness component, (4) a lightfast antioxidant, and (5) a colorant; an ink wherein the solid carbamate possesses a melting point of from about 60° C. to about 120° C. and an acoustic-loss value of from about 25 to about 80 dB/mm; the second carbamate (2) possesses a boiling point of from about 160 to about 225° C., a melting point of from about 25° C. to about 60° C. and an acoustic-loss value of from about 5 to about 40 dB/mm; a nonaqueous ink composition wherein the solid carbamate is present in an amount of from about 1 to about 98 percent by weight, the second carbamate (2) is present in an amount of from about 69 to about 1 percent by weight, the lightfastness component is a UV absorber present in an amount of from about 5 to about 0.25 percent by weight, the antioxidant is present in an amount of from about 5 to about 0.25 percent by weight, and the colorant is present in an amount of from about 20 to about 0.5 percent by weight, and wherein the total of all of the ink components is about 100 percent; a nonaqueous ink composition wherein the solid carbamate possesses a melting point of from about 60° C. to about 120° C. and is present in an amount of from about 1 to about 98 percent by weight and is selected from the group consisting of (1) tert-butyl carbamate, (2) 4,4'-methylenebis (dibutyldithio carbamate), (3) tert-butyl-N-(tert-butoxycarbonyloxy) carbamate, (4) tert-butyl-(2,4-dinitrophenoxy) carbamate, (5) benzyl carbamate, (6) benzyl N-hydroxycarbamate, (7) ethyidiphenyl carbamate, (8) 2-chloroethyl carbamate, (9) cyanomethyl-N,N-dimethyl diithiocarbamate, (10) RNHCOR' where R and R' are straight chain hydrocarbon residues, (11) potassium N-hydroxy methyl-N-methyl-dithiocarbamate, (12) sodium dimethyl dithiocarbamate, (13) disodium ethylenebis-dithio carbamate, (14) diethylammonium diethyldithio carbamate, (15) benzyl(S)-(−)-tetrahydro-5-oxo-3-furanyl carbamate, (16) diethyldithiocarbamic acid, ammonium salt, (17) diethyidithiocarbamic acid, diethyl ammonium salt, and (18) diethyidithiocarbamic acid, sodium salt, trihydrate; a nonaqueous ink composition wherein the solid carbamate (1) is selected from the group consisting of (1) tert-butyl carbamate, (2) tert-butyl-(2,4-dinitrophenoxy) carbamate, (3) benzyl N-hydroxycarbamate, (4) benzyl (S)-(−)-tetrahydro-5-oxo-3-furanyl carbamate, and (5) stearylcarbamoyl stearate; a nonaqueous ink composition wherein the second carbamate (2) possesses a boiling point of from about 150° C. to about 225° C. and a melting point of between about 25° C. to about 60° C. and is present in amounts of from about 69 to about 1 percent by weight and is selected from the group consisting of (1) acetone O-(benzyloxycarbonyl)oxime, (2) cyclopentanone oxime, (3) butyl carbamate, (4) tert-butyl N-(3-aminopropyl) carbamate, (5) tert-butyl N-(3-hydroxypropyl)carbamate, (6) tert-butyl-N-[benzyloxy)-carbamate, (7) tert-butyl-N-hydroxycarbamate, (8) tert-butyl-N-allylcarbamate, (9) benzyl N-(2-hydroxyethyl)carbamate, (10) benzyl-N,N-dimethyldithiocarbamate, and (11) ethyl N-methyl-N-phenylcarbamate; an ink wherein the lightfastness component is selected from the group consisting of (1) N-p-ethoxycarbonyl phenyl)-N'-ethyl-N'-phenyl formadine, (2) 1,1 -(1,2-ethane-diyl) bis(3,3,5,5-tetramethyl piperazinone), (3) 6-ethoxy-1,2-dihydro-2,2,4-trimethyl quinoline, (4) 2-(4-benzoyl-3-hydroxyphenoxy)ethyl acrylate, (5) 2-dodecyl-N-(2,2,6,6-tetramethyl-4-piperidinyl)succinimide, (6) 2-dodecyl-N-(1,2,2,6,6-pentamethyl-4-piperidinyl)succinimide, (7) N-(1 -acetyl-2, 2,6,6-tetramethyl-4-piperidinyl)-2-dodecyl succinimide, (8) [2,2,6,6-tetramethyl-4-piperidinyl/β,β,β',β'-tetramethyl-3,9-(2,4,8,10-tetraoxospiro(5,5)undecane)diethyl]-1,2,3,4-butanetetracarboxylate, (9) [1,2,2,6,6-pentamethyl-4-piperidinyl/β,β,β',β'-tetramethyl-3,9-(2,4,8,10-tetraoxo spiro (5,5) undecane)diethyl]-1,2,3,4-butane tetracarboxylate, and (10) [2,2,6,6-tetramethyl-4-piperidinyl)-1,2,3,4-butanetetra carboxylate; a nonaqueous ink wherein the lightfast antioxidant compound is selected from the group consisting of (1) antimony dialkyl phosphorodithioate, (2) molybdenum oxysulfide dithio carbamate, (3) nickel-bis(o-ethyl(3,5-di-tert-butyl-4-hydroxybenzyl)phosphonate, and (4) tetra sodium N-(1,2-dicarboxyethyl)-N-octadecyl sulfosuccinamate; an ink wherein the colorant is a dye or pigment; a printing process which comprises incorporating into an acoustic ink jet printer an ink comprised of (1) a solid carbamate, thiourea or an oxime compound, each with a melting point of from about 60° C. to about 120° C. and an acoustic-loss value of from about 25 to about 80 dB/mm, (2) an ink diluent having a melting point of between about 25° C. to about 60° C. with an acoustic-loss value of from about 5 to about 40 dB/mm, (3) a lightfast UV absorber, (4) a lightfast antioxidant, and (5) a colorant, and which ink possesses an acoustic-loss value of from about 10 to about 80 dB/mm, and which ink possesses a viscosity of from about 1 centipoise to about 10 centipoise at a temperature of from about 125° C. to about 165° C., and causing droplets of the ink to be ejected in imagewise pattern onto a substrate; a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, the radiation being brought to focus with a finite waist diameter in a focal plane, and causing droplets of the ink to be ejected in imagewise pattern onto a substrate; an ink wherein the colorant is selected in an amount of from about 0.5 to about 20 percent by weight; an ink wherein the colorant is selected in an amount of from about 2 to about 10 weight percent; an ink wherein the colorant is a pigment of carbon black; an ink wherein the colorant is cyan, magenta, yellow, black, or mixtures thereof; a nonaqueous ink composition wherein the carbamate compound is selected from the group consisting benzyl (S)-(-)-tetrahydro-5-oxo-3-furanyl carbamate; tert-butyl carbamate; 1-allyl-3-(2-hydroxyethyl)-2-thiourea, (2) the second carbamate is tert-butyl N-(3-aminopropyl) carbamate; tert-butyl-N-[benzyloxy)-carbamate, (3) the lightfast UV absorber is 2-dodecyl-N-(2,2,6,6-tetramethyl-4-piperidinyl) succinimide, [1,2,2,6,6-pentamethyl-4-piperidinyl/β,β, β',β'-tetramethyl-3,9-(2,4,8,10-tetraoxo spiro (5,5) undecane)diethyl]-1,2,3,4-butane tetracarboxylate, and (4) the lightfast antioxidant is tetra-sodium-N-(1,2-dicarboxyethyl)-N-octadecyl-sulfosuccinamate), molybdenum oxysulfide dithio carbamate; an ink with a viscosity of from about 1 centipoise to about 15 centipoise; an ink with a viscosity of from about 1 centipoise to about 10 centipoise and an acoustic loss of from about 10 to about 80 dB/mm; an ink with a viscosity of from about 1 centipoise to about 10 centipoise and an acoustic loss of from about 10 to about 80 dB/mm; an ink composition comprised of (1) a solid carbamate or thiourea or an oxime compound, each with a melting point of from about 65° C. to about 120° C. and each with an acoustic-loss value of from about 30 to about 80 dB/mm, (2) an ink diluent with a melting point of from about 25° C. to about 60° C. and with an acoustic-loss value of from about 5 to about 40 dB/mm, (3) a lightfastness component, (5) a lightfast antioxidant, and (6) a colorant; an ink that possesses an acoustic-loss value of from about 10 to about 80 dB/mm, a viscosity of from about 1 centipoise to about 14 centipoise at a temperature of from about 125° C. to about 165° C. and provides images with crease values of between about 20 to about 40, and haze values of about 10 to about 30, and wherein the colorant is a pigment, or a dye; an ink comprised of (1) a vehicle of a solid thiourea or a solid oxime, each with a melting point of from about 60° C. to about 120° C. and an acoustic-loss value of from about 25 to about 80 dB/mm, (2) a second thiourea or an oxime diluent with a boiling point of from about 160° C. to about 225° C., and a melting point of between about 25° C. and about 60° C. and with an acoustic-loss value of from about 5 to about 40 dB/mm, (3) a lightfastness component, (4) a lightfast antioxidant, and (5) a colorant, and which ink possesses an acoustic-loss value of from about 10 to about 80 dB/mm, a viscosity of from about 1 centipoise to about 10 centipoise at a temperature of from about 125° C. to about 165° C. and yields images with crease values of between about 20 to about 40, and haze values of between about 10 and about 30; an ink composition wherein the thiourea compound is present in an amount of from about 1 to about 98 percent by weight, is selected from the group consisting of (1) 1-allyl-2-thiourea, (2) 1-allyl-3-(2-hydroxyethyl)-2-thiourea, (3) 1-methyl-2-thiourea, (4)1-methallyl-3-methyl-2-thiourea, (5)1,3-dibutyl-2-thiourea, (6) 1,1,3,3-tetramethyl-2-thiourea, (7) N,N'-di-n-propyl thiourea, and (8) 1-benzyl-3-methyl-2-thiourea; an ink composition wherein the oxime compound is selected from the group consisting of (1) 2,3-butanedione monoxime, (2) acetone oxime, (3) cyclohexanone oxime, (4) 4-(trifluoromethoxy)benzamidoxime, (5) 2-nitrobenzaldoxime, and (6) 1-phenyl-1,2-propanedione 2-oxime; an ink which possesses an acoustic-loss value of from about 10 to about 80 dB/mm, and a viscosity of from about 1 centipoise to about 10 centipoise at a temperature of from about 125° C. to about 165° C. and yields images with a crease of from about 20 to about 45, and haze values of from about 10 to about 35; an ink which ink is free of water; ink compositions comprised of (1) a nonaqueous solid carbamate, thiourea, or an oxime compound, each with a melting point of lower than about, or equal to about 120° C. and preferably between about 60° C. to about 100° C., with a low acoustic loss value, and which acoustic loss is, for example, about equal to, or below about 100 dB/mm, and preferably in the range of between about 25 to about 80 dB/mm, (2) a liquid diluent derived from carbamate, thiourea, or an oxime compound having an acoustic-loss value of from about 5 to about 40 dB/mm and a boiling point of equal to greater than about 150° C. and lower than about 350° C., and preferably between about 170° C. to about 200° C., and with low acoustic loss value of below, or equal to about 60 dB/mm, and preferably in the range of between about 5 to about 40 dB/mm, and (3) a UV absorber, (4) an antioxidant, and (5) a colorant, and wherein the colorant is present in various suitable amounts.

Aspects of the present invention relate to an ink composition comprised of (1) a thiourea with, for example, a melting point of from about 60 to about 120° C. and with an acoustic-loss value of from about 25 to about 80 dB/mm, (2) an optional ink carbamate diluent with a melting point of from about 25° C. to about 60° C. and with an acoustic-loss value of from about 5 to about 40 dB/mm, (3) a lightfastness component, (4) a lightfast antioxidant, and (5) a colorant; an ink composition comprised of (1) an oxime with, for example, a melting point of from about 60 to about 120° C. and with an acoustic-loss value of from about 25 to about 80 dB/mm, (2) an optional ink carbamate diluent with a melting point of from about 25° C. to about 60° C. and with an acoustic-loss value of from about 5 to about 40 dB/mm, (3) a lightfastness component, (4) a lightfast antioxidant, and (5) a colorant; an ink which possesses an acoustic-loss value of from about 10 to about 80 dB/mm, a viscosity of from about 1 centipoise to about 10 centipoise at a temperature of from about 125° C. to about 165° C., and provides images with crease values of from about 20 to about 40, and haze values of about 10 to about 30; an ink that possesses an acousticloss value of from about 10 to about 80 dB/mm, a viscosity of from about 1 centipoise to about 14 centipoise at a temperature of from about 1250C to about 165° C., and provides images with crease values of from about 20 to about 45, and haze values of about 10 to about 30; an ink containing a (1) thiourea solid with a melting point of from about 60° C. to about 110° C. and an acoustic-loss value of from about 25 to about 80 dB/mm, and further containing (2) an optional second thiourea diluent with ("with" refers to, for example, throughout with respect to number ranges and includes all values therebetween) a boiling point of from about 160° C. to about 225° C., and a melting point of from about 25° C. and about 60° C. and with an acoustic-loss value of from about 5 to about 40 dB/mm, and which ink possesses an acoustic-loss value of from about 10 to about 80 dB/mm, a viscosity of from about 1 centipoise to about 10 centipoise at a temperature of from about 125° C. to about 165° C.; an ink containing (1) an oxime with a melting point of from about 60° C. to about 110° C. and an acoustic-loss value of from about 25 to about 80 dB/mm, (2) an optional thiourea or oxime diluent with a boiling point of from about 160° C. to about 225° C., and a melting point of from about 25° C. and about 60° C. and with an acoustic-loss value of from about 5 to about 40 dB/mm, and which ink possesses an acoustic-loss value of from about 10 to about 80 dB/mm, a viscosity of from about 1 centipoise to about 14 centipoise at a temperature of from about 125° C. to about 165° C. and yields images with crease values of from about 20 to about 40, and haze values of from about 10 to about 30; an ink composition wherein the thiourea is present in an amount of from about 1 to about 98 percent by weight, and is selected, for example, from the group consisting of (1) 1-allyl-2-thiourea, (2) 1-allyl-3-(2-hydroxyethyl)-2-thiourea, (3) 1-methyl-2-thiourea, (4) 1-methallyl-3-methyl-2-thiourea, (5) 1,3-dibutyl-2-thiourea, (6) 1,1,3,3-tetramethyl-2-thiourea, (7) N,N'-di-n-propyl thiourea, and (8) 1-benzyl-3-methyl-2-thiourea; an ink composition wherein the oxime compound is selected from the group consisting of (1) 2,3-butanedione monoxime, (2) acetone oxime, (3) cyclohexanone oxime, (4) 4-(trifluoromethoxy)benzamidoxime, (5) 2-nitrobenzaldoxime, and (6) 1-phenyl-1,2-propanedione 2-oxime; an ink composition wherein the lightfastness component is selected from the group consisting of (1) N-p-ethoxycarbonyl phenyl)-N'-ethyl-N'-phenyl formadine, (2) 1,1-(1,2-ethane-diyl) bis(3,3,5,5-tetramethyl piperazinone), (3) 6-ethoxy-1,2-dihydro-2,2,4-trimethyl quinoline, (4) 2-(4-benzoyl-3-hydroxyphenoxy)ethyl acrylate, (5) 2-dodecyl-N-(2,2,6,6-tetramethyl-4piperidinyl) succinimide, (6) 2-dodecyl-N-(1,2,2,6,6-penta methyl-4-piperidinyl)succinimide, (7) N-(1-acetyl-2,2,6,6-tetramethyl-4-piperidinyl)-2-dodecyl succinimide, (8) [2,2,6,6-tetramethyl-4-piperidinyl/β,β, β',β'-tetramethyl-3,9-(2,4,8,10-tetraoxospiro(5,5)undecane)diethyl]-1,2,3,4-butanetetracarboxylate (9) [1,2,2,6,6-pentamethyl-4-piperidinyl/β,β,β',β'-tetramethyl-3,9-(2,4,8,10-tetraoxo spiro (5,5) undecane)diethyl]-1,2,3,4-butane tetracarboxylate, and (10) [2,2,6,6-tetramethyl-4-piperidinyl)-1,2,3,4-butanetetra carboxylate; an ink composition wherein the antioxidant is selected from the group consisting of (1) antimony dialkyl phosphorodithioate, (2) molybdenum oxysulfide dithio carbamate, (3) nickel-bis(o-ethyl(3,5-di-tert-butyl-4-hydroxybenzyl)phosphonate), and (4) tetra sodium N-(1,2-dicarboxyethyl)-N-octadecyl sulfosuccinamate; an ink composition with a viscosity of from about 1 centipoise to about 14 centipoise, and an acoustic loss of from about 10 to about 80 dB/mm; an ink composition wherein the oxime is 2,3-butanedione monoxime; an ink composition wherein the oxime is acetone oxime; an ink composition wherein the oxime is cyclohexanone oxime; an ink composition wherein the oxime is 4-(trifluoromethoxy) benzamidoxime; an ink composition wherein the oxime is 2-nitrobenzaldoxime; an ink composition wherein the oxime is 1-phenyl-1,2-propanedione 2-oxime; an ink comprised of a thiourea, a lightfastness component, a lightfastness antioxidant, and a colorant; an ink comprised of an oxime, a lightfastness component, a lightfastness antioxidant, and a colorant; a printing process which comprises incorporating into an acoustic ink jet printer the inks illustrated herein, and causing droplets of the ink to be ejected in imagewise pattern onto a substrate; a process which comprises (a) providing an acoustic ink printer having a pool of the liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, and causing droplets of the ink to be ejected in imagewise pattern onto a substrate; a printing process which comprises incorporating into an acoustic ink jet printer the ink, and causing droplets of the ink to be ejected in imagewise pattern onto a substrate; and an ink wherein the colorant is a dye; an ink wherein the colorant is a pigment.

The thiourea, or the oxime compound can be present, for example, in an amount of from about 1 to about 98 percent by weight; and the second optional carbamate, thiourea, or oxime diluent with, for example, an acoustic-loss value of from about 5 to about 40 dB/mm can be present in the ink composition in an amount of, for example, from about 69 to about 1 percent by weight; the lightfastness compound can be present, for example, in an amount of from about 5 to about 0.25 percent by weight; the antioxidants can, for example, be present in an amount of from about 5 to about 0.25 percent by weight; and the colorant can, for example, be present in an amount of from about 20 to about 0.5 percent by weight, and wherein the total of all ink components is about 100 percent or 100 parts.

The ink composition contains, for example, the following range amounts, respectively, for components (1), the thiorea or oxime, to (5), the colorant:

[1+69+5+5+20=100] to [98+1+0.25+0.25+0.5=100].

In preferred embodiments the first thiourea, or the oxime ink vehicle compound is present in an amount of from about 15 to about 90 percent by weight, the optional diluent compound with, for example, a melting point of less than about 60° C. is present in an amount of from about 60 to about 7 percent by weight, the lightfastness compound is present in an amount of from about 5 to about 1 percent by weight, the antioxidant is present in an amount of from about 5 to about 1 percent by weight, and the colorant is present in an amount of from about 15 to about 1 percent by weight. The ink composition contains the following preferred range amounts respectively for each of the above components:

[15+60+5+5+15=100] to [90+7+1+1+1=100].

These composition ranges, and the others indicated herein can be established using a number of known techniques, such as a statistical design based on the analyses of the experimental data of viscosity at 150° C., jettability at 150° C., image quality, lightfast and waterfast values of images generated with various ink compositions.

The thiourea, or oxime compounds, the lightfastness component, and the antioxidant can be in the form of a crystalline or semicrystalline material in the solid state. A material can be considered crystalline if it is comprised of crystals with a regular arrangement of its atoms in the space lattice with, for example, a degree of crystallinity between about 70 to about 100 percent, and when this arrangement of atoms in the space lattice is irregular the material is considered as amorphous, with semicrystalline being part, for example, 50 percent, crystalline and 50 percent amorphous. When solidified on a substrate, such as paper or a transparency, the invention phase change inks can or may crystallize into a spherulitic morphology, and wherein the size of the spherulites is preferably, for example, from about 0.1 to about 10 microns, preferably between about 1 and about 4 microns, and the opacity thereof increases with the size of the spherulites. The spherulite size can be measured by an optical microscope with cross polarized light or by the low angle solid state light scattering method (R. S. Stein and M. B. Rhodes, J. Appl. Phys., 31, 1873 (1960)). A monochromatic, vertically polarized light is passed through the sample, and the scattered light is analyzed with another nicol prism, with its optic axis horizontal. This is conventionally known as the $H_v$ scattering method. The spherulite size is measured from the location of the maximum intensity in the four-leaf clover scattering pattern. The small spherulite size is also important for the achievement of improved crease resistanceIn embodiments, thus the present invention provides a composition of a thiourea, or an oxime compound, a colorant, a UV absorber and an antioxidant, and when solidified, the thiourea or oxime and diluent additives form a dispersed phase of small spherulitic crystalline domains in an admixed matrix. This is similar to the situation of polymer-dispersed liquid crystals selected for display devices, and this morphology of reduced spherulitic size of from about 6 to about 9 micrometers to about 0.5 to about 4 and more preferably between about 0.5 to about 1.0 micrometer measured with an optical microscope can improve the projection efficiency, and increase the crease resistance. Inks with the spherulite size of between about 0.5 to about 1 micrometer are in some instances considered ideal as they scatter a minimum of light thereby improving projection efficiency when printed on transparencies. The resistance to creasing is also increased with reduced spherulite size due to better intra molecular bonding between the ink molecules.

Examples of thioureas and oximes each with a melting point of, for example, about 60 to about 120° C. are (1) thiourea compounds of (i) 1-allyl-2thiourea, (Aldrich #10, 880-41); (ii) 1 -allyl-3-(2-hydroxyethyl)-2-thiourea, (Aldrich #A3,280-2); (iii) 1 -methyl-2-thiourea, (Aldrich #M8,460-7); (iv) 1 -methallyl-3-methyl2-thiourea, (Aldrich #19,046-2); (v) 1,3-dibutyl-2-thiourea, (Aldrich #D4,959-8); (vi) 1,1,3,3-tetramethyl-2-thiourea, (Aldrich #11,516-9); (vii) N,N'-di-n-propyl thiourea, (Alfa Organics #A17217); (viii) 1-benzyl-3-methyl-2-thiourea, (Aldrich #27,550-6); and the like; and (2) oxime compounds of (i) 2,3-butanedione monoxime, (Aldrich #11,213-5); (ii) acetone oxime, (Aldrich #A1,050-7); (iii) cyclohexanone oxime, (Aldrich #C10,220-2); (iv) 4-(trifluoromethoxy) benzamidoxime, (Aldrich #42,223-1); (v) 2-nitrobenzaldoxime, (Aldrich #24,204-7); (vi) 1-phenyl-1, 2-propanedione 2-oxime, (Aldrich #22,009-4); and the like.

The optional ink diluent that, for example, can reduce the viscosity of the phase-change ink from about 8 to about 12 centipoise to about 5 to about 6 centipoise and has a melting point of, for example, about equal to, or less than about 60° C. and an acoustic-loss value of, for example, from about 10 to about 40 dB/mm, and is selected, for example, from the group consisting of (1) acetone O-(benzyloxycarbonyl) oxime, (Aldrich #42,271-1); (2) cyclopentanone oxime, (Aldrich #C1 1,243-7); (3) butyl carbamate, (Aldrich #B9, 080-7); (4) tertbutyl N-(3-aminopropyl) carbamate, (Aldrich #43,699-2); (5) tert-butyl N-(3-hydroxypropyl) carbamate, (Aldrich #41,644-4); (6) tert-butyl-N-[benzyloxy)-carbamate, (Aldrich #40,769-0), (7) tert-butyl-N-hydroxycarbamate, (Aldrich #22,615-7), (8) tert-butyl-N-allylcarbamate, (Aldrich #42,233-9), (9) benzyl N-(2-hydroxyethyl)carbamate, (Aldrich #40,790-9), (10) benzyl-N,N-dimethyldithiocarbamate, (Aldrich #36,822-9), (11) ethyl N-methyl-N-phenylcarbamate, (Aldrich #30,951-6), and (12) 1 -methyl-2,2,3,3-tetrafluoropropyl carbamate, (Aldrich #15, 238-2).

The lightfastness components, especially UV absorbers that primarily protect the images from ultra violet light degradation and that are present in the inks include, for example, (1) N-p-ethoxycarbonylphenyl)-N'-ethyl-N'-phenylformadine, Givaudan Corporation, (2) 1,1-(1,2-ethane-diyl) bis(3,3,5,5-tetramethyl piperazinone), Goodrich Chemicals, (3) 2,2,4-trimethyl-1,2-hydroquinoline, Mobay Corporation, (4) 6-ethoxy-1,2-dihydro-2,2,4-trimethylquinoline, Monsanto-Chemicals, (5) 2,4,6-tris-(N-1,4-dimethylpentyl-4-phenylenediamino)-1,3,5-triazine, Uniroyal Corporation; (6) 2-(4-benzoyl-3-hydroxy phenoxy)ethylacrylate, (7) 2-dodecyl-N-(2,2,6,6-tetramethyl-4-piperidinyl) succinimide, (8) 2-dodecyl-N-(1, 2,2,6,6-pentamethyl-4-piperidinyl)succinimide, (9) N-(1 -acetyl-2,2,6,6-tetramethyl-4-piperidinyl)-2-dodecyl succinimide, all four available from Aldrich Chemicals, (10) 2,2,6,6-tetramethyl-4-piperidinyl/β,β,β', β'-tetramethyl-3,9-(2,4,8,10-tetraoxo-spiro(5,5)-undecane)diethyl]-1,2,3,4-butane tetracarboxylate, (11) [1,2,2,6,6-pentamethyl-4-piperidinyl/β,β,β',β'-tetramethyl-3,9-(2,4,8,10-tetraoxo-spiro-(5,5)undecane)diethyl]-1,2,3,4-butanetetra carboxylate, (12) [2,2,6,6-tetramethyl-4-piperidinyl)-1,2,3, 4-butane tetracarboxylate, all three available from Fairmount Corporation; and (13) nickel dibutyl dithio carbamate, available as UV-Chek AM-1 05 from Ferro Corporation.

Examples of lightfast antioxidants, which antioxidants primarily protect the inks from thermal degradation include (1) antimony dialkyl phosphorodithioate, (2) molybdenum oxysulfide dithio carbamate, both available from Vanderbilt Corporation, (3) nickel-bis(o-ethyl (3,5-di-tert-butyl-4hydroxybenzyl) phosphonate, Ciba Geigy Corporation, and (4) tetra sodium-N-(1,2-dicarboxyethyl)-N-octadecyl sulfosuccinamate, American Cyanamid Corporation.

Suitable colorants, present in an amount generally of from about 1 to about 20, and more specifically, from about 2 to about 10 percent by weight, include pigments and dyes, with solvent dyes being preferred. Any suitable dye or pigment may be selected, providing, for example, that it is capable of being dispersed or dissolved in the vehicle and is compatible with the other ink components. Colorants include pigments, dyes, mixtures thereof, mixtures of dyes, mixtures of pigments, and the like.

Examples of pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-1 11-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2GO1 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks, such as REGAL 330® (Cabot), Carbon Black 5250, Carbon Black 5750 (Columbia Chemical Company).

Dye examples are Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling agents of the present application. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G,Aizen Spilon Yellow C-GNH (Hodogaya Chemical Company), Sirius Supra Yellow GD 167, Cartasol Brilliant Yellow 4GF (Sandoz), Pergasol Yellow CGP (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc. A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

The inks of the present invention can be prepared by any suitable method. A colored phase-change ink composition can be prepared by mixing 45 percent by weight of a solid additive with an acoustic-loss value of less than about 60 dB/mm, and preferably less than about 40 dB/mm and a melting point of point of between about 60° C. to about 120° C.; 40 percent by weight of an ink diluent having a melting point of lower than about 60° C., 5 percent by weight of a lighfast UV absorber, 5 percent by weight of lightfast antioxidant and 5 percent by weight of a colorant. The mixture resulting can then be heated to a temperature of about 120° C. and stirred for a period of about 60 minutes until there is formed a homogeneous solution, and subsequently the solution can be cooled to 25° C.

The inks of the present invention are particularly suitable for printing processes wherein the substrate, such as paper, transparency material, or the like, is heated during the printing process to facilitate formation of the liquid crystalline phase within the ink. When transparency substrates are employed, temperatures typically about 100° C. to about 110° C., since the polyester typically employed, as the base sheet in transparency sheets tends to deform at higher temperatures. Specially, formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges. More specifically, the inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin*, Vol. 16, No. 4, September 1973, pages 1168 to 1170, the disclosure of which is totally incorporated herein by reference, and the appropriate copending applications recited herein. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension, which causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

The size of the ejection orifice is an important design parameter of an ink jet since it primarily determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Patent 4,751,529, U.S. Pat. No. 4,751,530, U.S. Pat. No. 4,751,534, U.S. Patent 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys., Vol.* 65, No. 9 (May 1, 1989) and references therein, the disclosure of which is totally incorporated herein by reference.

Acoustic-loss measurements were measured as follows: samples of about 1 to about 5 grams of, for example, the solid carbamate and the second liquid carbamate were placed between the two transducers, with the temperature set at 150° C. The samples were permitted to equilibrate at 150° C. for five minutes. The two transducers were brought together to maximize the acoustic signal. The amplitude and the position of the signals were recorded. The two transducers were separated by a distance varying from about 25.4 microns to about 125.4 microns recording each time the amplitude and the position of the signal. Each measurement was performed three times and three samples of the same material were measured. The attenuation dB/mm was then calculated by ratioing the amplitude values obtained at different separation distances. The liquid carbamate compounds of the present application had dB/mm values of, for example, about 15 to about 40, whereas the solid carbamate compounds had dB/mm values of, for example, about 35 to about 65.

The optical density values, for example from about 2.0 to 2.25 (Black), 1.8 to 1.85 (Cyan), 1.9 to 2.0 (Magenta), 1.4 to 1.44 (Yellow), were measured on a Pacific Spectrograph Color System in a reflectance mode. The system consists of two major components, an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information The lightlessness values of the ink jet, which are, for example, between about 90 to about 100 percent and preferably between about 95 to about 100 percent, were measured in a Mark V Lightfast Tester obtained from Microscal Company, London, England; the waterfast values of the inks, which are, for example, between about 90 to about 100 percent and preferably between about 95 to about 100 percent, were obtained from the recorded optical density data and after washing with water at 250C for five minutes; and the viscosity values, especially for the Examples, were measured at 150° C. with a Stress Rheometer from Cari-Med model CSL 100. All experiments were performed at a shear rate of 1,250 s$^{-1}$.

The average width of the creased image due to pressure was obtained on colored and black solid area images printed on paper by (1) folding inwards the printed area of the image, (2) passing on the folded image a standard Teflon coated copper roll 2 inches in width, 3 inches in outer diameter, 2.25 inches in inner diameter and weighing 860 grams, (3) unfolding the paper and wiping the loose ink from the creased imaged surface with a cotton swab, and (4) measuring the average width of the ink free creased area with an image analyzer.

The haze values of the images generated with the invention inks are in embodiments, for example, between about 10 to about 30 and preferably between about 10 to about 20 and were measured on images printed on uncoated polyester, such as MYLAR®, with a Haze meter XL-21 1, HAZE-GARD® System obtained from Pacific Scientific Company.

Specific embodiments of the invention will now be described in detail. These examples are intended to be illustrative, and the invention is not limited to the materials, conditions, or process recited. All parts and percentages are by weight unless otherwise indicated.

EXAMPLE I

A black phase-change ink composition was prepared by mixing 45 percent by weight of the solid additive tert-butyl carbamate, (Aldrich #16,739-8) having a melting point of 106° C. and an acoustic-loss value of 40 dB/mm; 40 percent by weight of the ink diluent ethyl N-methyl-N-phenylcarbamate (Aldrich #30,951-6); having an acoustic-loss value of 20 dB/mm and a boiling point of 244° C.; 5 percent by weight of the lightfastness UV absorber 2-dodecyl-N-(2,2,6,6-tetramethyl-4-piperidinyl) succinimide (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Neozapon Black X51 [C.I. Solvent Black; C.I. #12195] (BASF). The mixture resulting was heated to a temperature of about 120° C. and stirred for a period of about 60 minutes until it formed a homogeneous solution, and which solution was subsequently was cooled to 25° C. The resulting black ink had an average spherulitic radius of 3.5 micrometers, an acoustic loss value of 39 dB/mm and a viscosity of 5.1 cps at 150° C.

EXAMPLE II

A blue phase-change ink composition was prepared by mixing 45 percent by weight of the solid additive benzyl (S)-(-)-tetrahydro-5-oxo-3-furanyl carbamate (Aldrich #41,924-9) having a melting point of 104° C. and an acoustic-loss value of 38 dB/mm; 40 percent by weight of the ink diluent tertbutyl-N-[benzyloxy)-carbamate, (Aldrich #40,769-0) having an acoustic-loss value of 30 dB/mm and a melting point of 46° C.; 5 percent by weight of the UV absorber 2-dodecyl-N-(2,2,6,6-tetramethyl-4-piperidinyl) succinimide, (Aldrich #41,317-8), 5 percent by weight of the antioxidant tetra sodium-N-(1,2dicarboxyethyl)-N-octadecyl sulfosuccinamate, Aerosol 22N, American Cyanamid Corporation, and 5 percent by weight of the colorant Sudan Blue 670 [C.I. #61554] (BASF). The mixture resulting was heated to a temperature of about 120° C. and stirred for a period of about 60 minutes until it formed a homogeneous solution, and subsequently was cooled to 25° C. The resulting blue ink had an average spherulitic radius of 3.2 micrometer, an acoustic loss value of 39 dB/mm and a viscosity of 5.15 cps at 150° C.

EXAMPLE III

A yellow phase-change ink composition was prepared by mixing 45 percent by weight of the solid additive tert-butyl-(2,4-dinitrophenoxy) carbamate (Aldrich #33,305-0) having a melting point of 790C and an acousticloss value of 37 dB/mm; 40 percent by weight of the ink diluent tert-butyl-N-(benzyloxy)-carbamate, (Aldrich #40,769-0) having an acoustic-loss value of 30 dB/mm and a melting point of 46° C.; 5 percent by weight of the UV absorber 2-dodecyl-N-(2,2,6,6-tetramethyl-4-piperidinyl) succinimide, (Aldrich #41,317-8), 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Yellow 146 [C.I. #12700] (BASF). The mixture resulting was heated to a temperature of about 100° C. and stirred for a period of about 60 minutes until it formed a homogeneous solution, and subsequently was cooled to 25° C. The resulting yellow ink had an average spherulitic radius of 3.2 micrometers, an acoustic loss value of 38 dB/mm and a viscosity of 5.05 cps at 150° C.

EXAMPLE IV

A red phase-change ink composition was prepared by mixing 45 percent by weight of the solid stearyl carbamoyl stearate having a melting point of 85° C. and an acoustic-loss value of 37 dB/mm; 40 percent by weight of the ink diluent benzyl-N-(2-hydroxyethyl)carbamate (Aldrich #40,790-9) having an acoustic-loss value of 30 dB/mm and a melting point of 59° C.; 5 percent by weight of the UV absorber 2-dodecyl-N-(2,2,6,6-tetramethyl-4-piperidinyl) succinimide, (Aldrich #41,317-8), 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Sudan Red 462 [C.I. #26050] (BASF). The mixture resulting was heated to a temperature of about 1200C and stirred for a period of about 60 minutes until it formed a homogeneous solution, and subsequently was cooled to 25° C. The resulting red ink had an average spherulitic radius of 3.2 micrometers, an acoustic loss value of 38 dB/mm and a viscosity of 5.02 cps at 1500C.

Each of the above four inks was incorporated into an acoustic ink jet printer as disclosed in U.S. Pat. No. 4,745,419, the disclosure of which is totally incorporated herein by reference. A jetting frequency of 160 MHz was used to generate drops of about 2 picoliters, up to 12 drops per pixel at 600 spi. The images formed on paper exhibited excellent color quality with optical density values of 2.25 (Black), 1.85 (Cyan), 2.00 (Magenta), and 1.44 (Yellow), and sharp edges, with lightfast values of Black (98 percent), Cyan (99 percent), Magenta (95 percent), Yellow (98 percent); waterfast values of Black (99.5 percent), Cyan (99 percent), Magenta (99 percent), Yellow (100 percent). The crease values of black, cyan, magenta and yellow ink images were measured at Black (25), Cyan (28), Magenta (22), Yellow (28). The images formed on uncoated MYLAR™ exhibited excellent color quality with optical density values of 1.62 (Black), 1.57 (Cyan), 1.42 (Magenta), and 0.97 (Yellow). The haze values of the black, cyan, magenta and yellow ink images were measured at Black (25), Cyan (27), Magenta (24), Yellow (27).

EXAMPLE V

A black phase-change ink composition was prepared by mixing 45 percent by weight of the solid additive ethyl-diphenyl carbamate (Aldrich #37,291-9) having a melting point of 71° C. and an acoustic-loss value of 36 dB/mm; 40 percent by weight of the ink diluent tert-butyl-N-

(benzyloxy)carbamate, (Aldrich #40,769-0) having an acoustic-loss value of 30 dB/mm and a melting point of 46° C.; 5 percent by weight of the UV absorber [1,2,2,6, 6pentamethyl-4-piperidinyl/β,β,β',β'-tetramethyl-3,9-(2,4,8, 10-tetraoxospiro (5,5) undecane)diethyl]-1,2,3,4-butane tetracarboxylate, Mixxim HALS 63, Fairmount Corporation, 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Neozapon Black X51 [C.I. Solvent Black; C.I. #12195] (BASF). The resulting mixture was heated to a temperature of about 120° C. and stirred for a period of about 60 minutes until it formed a homogeneous solution, and subsequently was cooled to 25° C. The resulting black ink had an average spherulitic radius of 2.8 micrometer, an acoustic loss value of 39 dB/mm and a viscosity of 5.1 cps (centipoise) at 150° C.

EXAMPLE VI

A blue phase-change ink composition was prepared by mixing 45 percent by weight of the solid additive 1-allyl-3-(2-hydroxyethyl)-2-thiourea (Aldrich #A3,280-2), having a melting point of 780C and an acoustic-loss value of 36 dB/mm; 40 percent by weight of the ink diluent tert-butyl-N-(benzyloxy)-carbamate, (Aldrich #40,769-0) having an acoustic-loss value of 30 dB/mm and a melting point of 46° C.; 5 percent by weight of the UV absorber 2-dodecyl-N(2, 2,6,6-tetra methyl-4-piperidinyl) succinimide, (Aldrich #41, 317-8), 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Sudan Blue 670 [C.I. #61554] (BASF). The mixture resulting was heated to a temperature of about 120° C. and stirred for a period of about 60 minutes until it formed a homogeneous solution, and the solution subsequently was cooled to 25° C. The resulting blue ink had an average spherulitic radius of 2.5 micrometers, an acoustic loss value of 39 dB/mm and a viscosity of 5.05 cps at 150° C.

EXAMPLE VII

A yellow phase-change ink composition was prepared by mixing 46 percent by weight of the solid additive 1,1,3,3-tetramethyl-2-thiourea (Aldrich #11,516-9) having a melting point of 76° C. and an acoustic-loss value of 39 dB/mm; 40 percent by weight of the ink diluent tert-butyl-N-(benzyloxy)carbamate (Aldrich #40,769-0) having an acoustic-loss value of 30 dB/mm and a melting point of 46° C.; 5 percent by weight of the lightfastness UV absorber 2-dodecyl-N-(2,2,6,6-tetra methyl-4-piperidinyl) succinimide (Aldrich #41,317-8), 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Yellow 146 [C.I. #12700] (BASF). The mixture resulting was heated to a temperature of about 120° C. and stirred for a period of about 60 minutes until it formed a homogeneous solution, and subsequently the solution was cooled to 25° C. The yellow ink resulting had an average spherulitic radius of 2.7 micrometer, an acoustic loss value of 38 dB/mm and a viscosity of 5.05 cps at 150° C.

EXAMPLE VIII

A red phase-change ink composition was prepared by mixing 45 percent by weight of the solid additive cyclohexanone oxime (Aldrich #C10,220-2) having a melting point of 90° C. and an acoustic-loss value of 37 dB/mm; 40 percent by weight of the ink diluent cyclopentanone oxime (Aldrich #C11,243-7) having an acoustic-loss value of 30 dB/mm and a melting point of 54° C.; 5 percent by weight of the UV absorber 2-dodecyl-N-(2,2,6,6-tetramethyl4-piperidinyl) succinimide, (Aldrich #41,317-8), 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Red 462 [C.I. #26050] (BASF). The mixture resulting was heated to a temperature of about 120° C. and stirred for a period of about 60 minutes until it formed a homogeneous solution, and subsequently was cooled to 25° C. The resulting red ink had an average spherulitic radius of 2.9 micrometer, an acoustic loss value of 38 dB/mm and a viscosity of 5.02 cps at 150° C.

Each of the above four inks was incorporated into an acoustic ink jet printer as disclosed in U. S. Pat. No. 4,745,419, the disclosure of which is totally incorporated herein by reference, equipped with a carrier for transporting a generally uniformly thick film of hot melt ink across its printhead, together with a heating means for liquefying the ink as it nears the printhead. The droplet ejectors were acoustically coupled to the ink via the carrier, and their output focal plane is essentially coplanar with the free surface of the liquefied ink, thereby enabling them to eject individual droplets of ink therefrom on command. The ink was transported across the printhead at a sufficiently high rate to maintain the free surface which it presents to the printhead at a substantially constant level. A variety of carriers may be employed, including thin plastic and metallic belts and webs, and the free surface of the ink maybe completely exposed or it may be partially covered by a mesh or perforated layer. A separate heating element may be provided for liquefying the ink, or the lower surface of the carrier may be coated with a thin layer of electrically resistive material for liquefying the ink by localized resistive heating. A jetting frequency of 160 MHz was used to generate drops of about 2 picoliters, up to 12 drops per pixel at 600 spi. The images formed on paper exhibited excellent color quality with optical density values of 2.16 (Black), 1.82 (Cyan), 1.98 (Magenta), 1.37 (Yellow), sharp edges, lightfast values of Black (98.5 percent), Cyan (99 percent), Magenta (96 percent), Yellow (99 percent), waterfast values of Black (100 percent), Cyan (99 percent), Magenta (99.5 percent), Yellow (100 percent). The crease values of the black, cyan, magenta and yellow ink images were measured at Black (25), Cyan (28), Magenta (22), Yellow (28). In comparison, the crease values of about 60 are acceptable in a xerographic colored and black image. The images formed on uncoated MYLAR™ exhibited excellent color quality with transmitted optical density values of 1.62 (Black), 1.57 (Cyan), 1.42 (Magenta), 0.97 (Yellow), and sharp edges. The haze values of the black, cyan, magenta and yellow ink images were measured at Black (28), Cyan (25), Magenta (25), Yellow (28).

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) a thiourea with a melting point of from about 60 to about 120° C. and with an acoustic-loss value of from about 25 to about 80 dB/mm, (2) an ink carbamate with a melting point of from about 25° C.

to about 60° C. and with an acoustic-loss value of from about 5 to about 40 dB/mm, (3) a lightfastness component, (4) a lightfast antioxidant, and (5) a colorant.

2. A ink composition comprised of (1) an oxime with a melting point of from about 60 to about 120° C. and with an acoustic-loss value of from about 25 to about 80 dB/mm, (2) a carbamate with a melting point of from about 25° C. to about 60° C. and with an acoustic-loss value of from about 5 to about 40 dB/mm, (3) a lightfastness component, (4) a lightfast antioxidant, and (5) a colorant.

3. An ink in accordance with claim 1 wherein said ink possesses an acoustic-loss value of from about 10 to about 80 dB/mm, a viscosity of from about 1 centipoise to about 10 centipoise at a temperature of from about 125° C. to about 165° C., and provides images with crease values of from about 20 to about 40, and haze values of about 10 to about 30.

4. An ink in accordance with claim 2 wherein said ink possesses an acoustic-loss value of from about 10 to about 80 dB/mm, a viscosity of from about 1 centipoise to about 10 centipoise at a temperature of from about 125° C. to about 165° C., and provides images with crease values of from about 20 to about 40, and haze values of about 10 to about 30.

5. An ink in accordance with claim 1 containing said (1) thiourea with a melting point of from about 60° C. to about 110° C. and an acoustic-loss value of from about 25 to about 80 dB/mm, and further containing (2) a second thiourea diluent with a boiling point of from about 160° C. to about 225° C., and a melting point of from about 25° C. to about 60° C. and with an acoustic-loss value of from about 5 to about 40 dB/mm, and which ink possesses an acoustic-loss value of from about 10 to about 80 dB/mm, a viscosity of from about 1 centipoise to about 10 centipoise at a temperature of from about 125° C. to about 165° C. and which ink yields images with crease values of from about 20 to about 40, and haze values of from about 10 to about 30.

6. An ink in accordance with claim 2 containing said (1) oxime with a melting point of from about 60° C. to about 110° C. and an acoustic-loss value of from about 25 to about 80 dB/mm, (2) a second oxime diluent with a boiling point of from about 160° C. to about 225° C., and a melting point of from about 25° C. and about 60° C. and with an acoustic-loss value of from about 5 to about 40 dB/mm, and which ink possesses an acoustic-loss value of from about 10 to about 80 dB/mm, a viscosity of from about 1 centipoise to about 10 centipoise at a temperature of from about 125° C. to about 165° C. and yields images with crease values of from about 20 to about 40, and haze values of from about 10 to about 30.

7. An ink composition in accordance with claim 1 wherein the thiourea is present in an amount of from about 1 to about 98 percent by weight, and is selected from the group consisting of (1) 1-allyl-2-thiourea, (2) 1-allyl-3-(2-hydroxyethyl)-2-thiourea, (3) 1-methyl-2-thiourea, (4) 1-methallyl-3-methyl-2-thiourea, (5)1,3-dibutyl-2-thiourea, (6)1,1,3,3-tetramethyl-2-thiourea, (7) N,N'-di-n -propyl thiourea, and (8) 1-benzyl-3-methyl-2-thiourea.

8. An ink composition in accordance with claim 2 wherein said oxime is selected from the group consisting of (1) 2,3-butanedione monoxime, (2) acetone oxime, (3) cyclohexanone oxime, (4) 4-(trifluoromethoxy)benzamidoxime, (5) 2-nitrobenzaldoxime, and (6) 1-phenyl-1,2-propanedione 2-oxime.

9. An ink composition in accordance with claim 1 wherein said lightfastness component is selected from the group consisting of (1) N-p-ethoxycarbonyl phenyl)-N'-ethyl-N'-phenyl formadine, (2) 1,1-(1,2-ethane-diyl) bis(3,3,5,5-tetramethyl piperazinone), (3) 6-ethoxy-1,2-dihydro-2,2,4-trimethyl quinoline, (4) 2-(4-benzoyl-3-hydroxyphenoxy) ethyl acrylate, (5) 2-dodecyl-N-(2,2,6,6-tetramethyl-4-piperidinyl)succinimide, (6) 2-dodecyl-N-(1,2,2,6,6-penta methyl-4-piperidinyl)succinimide, (7) N-(1-acetyl-2,2,6,6-tetramethyl-4-piperidinyl)-2-dodecyl succinimide, (8) [2,2, 6,6-tetramethyl-4-piperidinyl/β,β, β', β'-tetramethyl-3,9-(2, 4,8,10-tetraoxospiro(5,5)undecane)diethyl]-1,2,3,4-butanetetracarboxylate (9) [1,2,2,6,6-pentamethyl-4-piperidinyl/β, β, β', β'-tetramethyl-3,9-(2,4,8,10-tetraoxo spiro (5,5) undecane)diethyl]-1,2,3,4-butane tetracarboxylate, and (10) [2,2,6,6-tetramethyl-4-piperidinyl)-1,2,3,4-butanetetra carboxylate.

10. An ink composition in accordance with claim 1 wherein said antioxidant is selected from the group consisting of (1) antimony dialkyl phosphorodithioate, (2) molybdenum oxysulfide dithio carbamate, (3) nickel-bis(o-ethyl (3,5-di-tert-butyl-4-hydroxybenzyl)phosphonate), and (4) tetra sodium N-(1,2 -dicarboxyethyl)-N-octadecyl sulfosuccinamate.

11. An ink composition in accordance with claim 1 wherein said thiourea is 1-allyl-3-(2-hydroxyethyl)-2-thiourea; said carbamate is tert-butyl N-(3-aminopropyl) carbamate or tert-butyl-N-[benzyloxy)-carbamate; said lightfastness component is 2-dodecyl-N-(2,2,6,6-tetramethyl-4-piperidinyl) succinimide or [1,2,2,6,6-pentamethyi-4-piperidinyl/β,β,β',β'-tetramethyl-3,9-(2,4,8, 10-tetraoxospiro (5,5) undecane)diethyl]-1,2,3,4-butane tetracarboxylate, and said lightfastness antioxidant is tetra-sodium-N-(1,2-dicarboxyethyl)-N-octadecyl-sulfosuccinamate), molybdenum oxysulfide dithio carbamate.

12. An ink composition in accordance with claim 1 with a viscosity of from about 1 centipoise to about 15 centipoise.

13. An ink composition in accordance with claim 1 with a viscosity of from about 1 centipoise to about 10 centipoise, and an acoustic loss of from about 10 to about 80 dB/mm.

14. An ink composition in accordance with claim 2 wherein said oxime is 2,3-butanedione monoxime.

15. An ink composition in accordance with claim 2 wherein said oxime is acetone oxime.

16. An ink composition in accordance with claim 2 wherein said oxime is cyclohexanone oxime.

17. An ink composition in accordance with claim 2 wherein said oxime is 4-(trifluoromethoxy)benzamidoxime.

18. An ink composition in accordance with claim 2 wherein said oxime is 2-nitrobenzaldoxime.

19. An ink composition in accordance with claim 2 wherein said oxime is 1 -phenyl-1,2-propanedione 2-oxime.

20. An ink comprised of a non-polymeric oxime, a lightfastness component, an antioxidant, and a colorant.

21. A printing process which comprises incorporating into an acoustic ink jet printer the ink of claim 1, and causing droplets of the ink to be ejected in imagewise pattern onto a substrate.

22. A process which comprises (a) providing an acoustic ink printer having a pool of the liquid ink of claim 1 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

23. A printing process which comprises incorporating into an acoustic ink jet printer the ink of claim 2, and causing droplets of the ink to be ejected in imagewise pattern onto a substrate.

24. A printing process which comprises incorporating into an acoustic ink jet printer the ink of claim 7, and causing droplets of the ink to be ejected in imagewise pattern onto a substrate.

25. A printing process which comprises incorporating into an acoustic ink jet printer the ink of claim 20, and causing droplets of the ink to be ejected in imagewise pattern onto a substrate.

26. An ink in accordance with claim 1 wherein said colorant is a dye.

27. An ink in accordance with claim 1 wherein said colorant is a pigment.

28. A process for the preparation of an ink comprising mixing a thiourea, a carbamate, a lightfastness compound, an antioxidant, and a colorant.

29. A process for the preparation of an ink comprising mixing an oxime, a carbamate, a lightfastness compound, an antioxidant, and a colorant.

30. An ink in accordance with claim 1 substantially free of water.

31. An ink in accordance with claim 1 and which ink is free of water.

32. An ink composition consisting essentially of (1) a thiourea with a melting point of from about 60 to about 1 20° C. and with an acoustic-loss value of from about 25 to about 80 dB/mm, (2) an ink carbamate with a melting point of from about 25° C. to about 60° C. and with an acoustic-loss value of from about 5 to about 40 dB/mm, (3) a lightfastness component, (4) a lightfast antioxidant, and (5) a colorant.

33. A ink composition consisting essentially of (1) an oxime with a melting point of from about 60 to about 120° C. and with an acoustic-loss value of from about 25 to about 80 dB/mm, (2) a carbamate with a melting point of from about 250C to about 600C and with an acoustic-loss value of from about 5 to about 40 dB/mm, (3) a lightfastness component, (4) a lightfast antioxidant, and (5) a colorant.

34. An ink in accordance with claim 1 wherein said thiourea is a non-polymeric thiourea.

35. An ink in accordance with claim 1 wherein said thiourea is a non-polymeric thiourea.

36. An ink in accordance with claim 2 wherein said oxime is a non-polymeric oxime.

37. An ink in accordance with claim 2 wherein said oxime is a non-polymeric oxime.

38. A printing process which comprises incorporating into an acoustic ink jet printer the ink of claim 30, and causing droplets of the ink to be injected in an imagewise pattern onto a substrate.

39. A process which comprises (a) providing an acoustic ink printer having a pool of the liquid ink of claim 32 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

40. A process which comprises (a) providing an acoustic ink printer having a pool of the liquid ink of claim 34 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

41. A process which comprises (a) providing an acoustic ink printer having a pool of the liquid ink of claim 35 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

42. An ink composition comprised of (1) a thiourea with a melting point of from about 60 to about 120° C. and with an acoustic-loss value of from about 25 to about 80 dB/mm, (2) an ink carbamate with a melting point of from about 25° C. to about 60° C. and with an acoustic-loss value of from about 5 to about 40 dB/mm, (3) a lightfastness component, (4) a lightfast antioxidant, and (5) a colorant wherein said ink possesses acoustic-loss value of from about 10 to about 80 dB/mm, a viscosity of from about 1 centipoise to about 10 centipoise at a temperature of from about 125° C. to about 165° C., and provides images with crease values of from about 20 to about 40, and haze values of about 10 to about 30.

43. An ink composition comprised of (1) a thiourea with a melting point of from about 60 to about 120° C. and with an acoustic-loss value of from about 25 to about 80 dB/mm, (2) an ink carbamate with a melting point of from about 25° C. to about 60° C. and with an acoustic-loss value of from about 5 to about 40 dB/mm, (3) a lightfastness component, (4) a lightfast antioxidant, and (5) a colorant in which ink further contains (2) a second thiourea diluent with a boiling point of from about 160° C. to about 225° C., and a melting point of from about 25° C. to about 60° C. and with an acoustic-loss value of from about 5 to about 40 dB/mm, and which ink possesses an acoustic-loss value of from about 10 to about 80 dB/mm, a viscosity of from about 1 centipoise to about 10 centipoise at a temperature of from about 125° C. to about 165° C. and which ink yields images with crease values of from about 20 to about 40, and haze values of from about 10 to about 30.

44. An ink composition comprised of (1) a thiourea with a melting point of from about 60 to about 120° C. and with an acoustic-loss value of from about 25 to about 80 dB/mm, (2) an ink carbamate with a melting point of from about 25° C. to about 60° C. and with an acoustic-loss value of from about 5 to about 40 dB/mm, (3) a lightfastness component, (4) a lightfast antioxidant, and (5) a colorant wherein said thiourea and is selected from the group consisting of (1) 1-allyl-2-thiourea, (2) 1-allyl-3-(2-hydroxyethyl)-2-thiourea, (3)1-methyl-2-thiourea, (4)1-methallyl-3-methyl-2-thiourea, (5)1,3-dibutyl-2-thiourea, (6)1,1,3,3-tetramethyl-2-thiourea, (7) N,N'-di-n-propyl thiourea, and (8) 1-benzyl-3-methyl-2-thiourea.

45. A ink composition comprised of (1) an oxime with a melting point of from about 60 to about 120° C. and with an acoustic-loss value of from about 25 to about 80 dB/mm, (2) an ink carbamate with a melting point of from about 25° C. to about 60° C. and with an acoustic-loss value of from about 5 to about 40 dB/mm, (3) a lightfastness component, (4) a lightfast antioxidant, and (5) a colorant wherein said oxime is 2,3-butanedione monoxime, cyclohexanone oxime, 4-(trifluoromethoxy)benzamidoxime, 2-nitrobenzaldoxime, and 1-phenyl-1,2-propanedione 2-oxime.

\* \* \* \* \*